United States Patent
Jois et al.

[19]

[11] Patent Number: 6,112,242

[45] Date of Patent: *Aug. 29, 2000

[54] SYSTEM AND METHOD FOR DYNAMIC DATA INTERACTION IN A HYPERTEXT DATA PROCESSING SYSTEM

[75] Inventors: Suresh Krishna Jois, Cupertino; Alex Stankovic; William Stankovic, both of Palo Alto; Arthur Dressel, Campbell, all of Calif.

[73] Assignee: ULN Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,855

[22] Filed: Jul. 10, 1996

[51] Int. Cl.⁷ .................................................. G06F 15/173

[52] U.S. Cl. ........................ 709/225; 709/203; 709/217; 709/226; 709/229; 707/10; 707/513

[58] Field of Search ........... 395/200.01, 200.03–200.33, 395/603, 821, 610, 774, 200.36, 200.46–200.49, 200.55–200.58; 709/200–203, 205, 216–219, 225–229; 707/9–10, 104, 500–501, 513

[56] References Cited

U.S. PATENT DOCUMENTS

| | | | |
|---|---|---|---|
| 5,491,820 | 2/1996 | Belove et al ............................ | 709/203 |
| 5,530,852 | 6/1996 | Meske, Jr. et al. ..................... | 709/206 |
| 5,572,643 | 11/1996 | Judson .................................... | 709/218 |
| 5,793,972 | 8/1998 | Shane ..................................... | 709/219 |
| 5,802,299 | 9/1998 | Logan et al. ............................ | 709/218 |
| 5,835,722 | 11/1998 | Bradshaw et al ....................... | 709/225 |
| 5,857,201 | 1/1999 | Wright, Jr. et al. .................... | 707/104 |
| 5,894,554 | 4/1999 | Lowery et al. ......................... | 709/203 |

OTHER PUBLICATIONS

Documentation from MiniVend Website Relating to "Shopping Cart" Software, retrieved from http://www.minivend,com/minivend/ on Jan. 8, 1997.

*Primary Examiner*—Zarni Maung
*Assistant Examiner*—Bharat Barot
*Attorney, Agent, or Firm*—Majestic, Parsons, Siebert & Hsue P.C.

[57] ABSTRACT

A composite Web page is made up of a plurality of subpages. It allows a user to input data to a Web server in one subpage while interactively displaying a response from the server of the input on another subpage. When an input is made, an URL is also sent to the server to run a program that updates a database and generates a response. The program also generates a composite Web page incorporating the response in one of the subpages. Each subpage is formed with the use of subtemplates which may contain partially formed text and hypertext markup elements as well as program tags for the server to interpret and execute subprograms upon them. Each subprogram typically produces an output that is written to the tag location in hypertext markup language format. In another embodiment, the subtemplates and the program are sent to the client to construct the interactive Web page there.

11 Claims, 5 Drawing Sheets

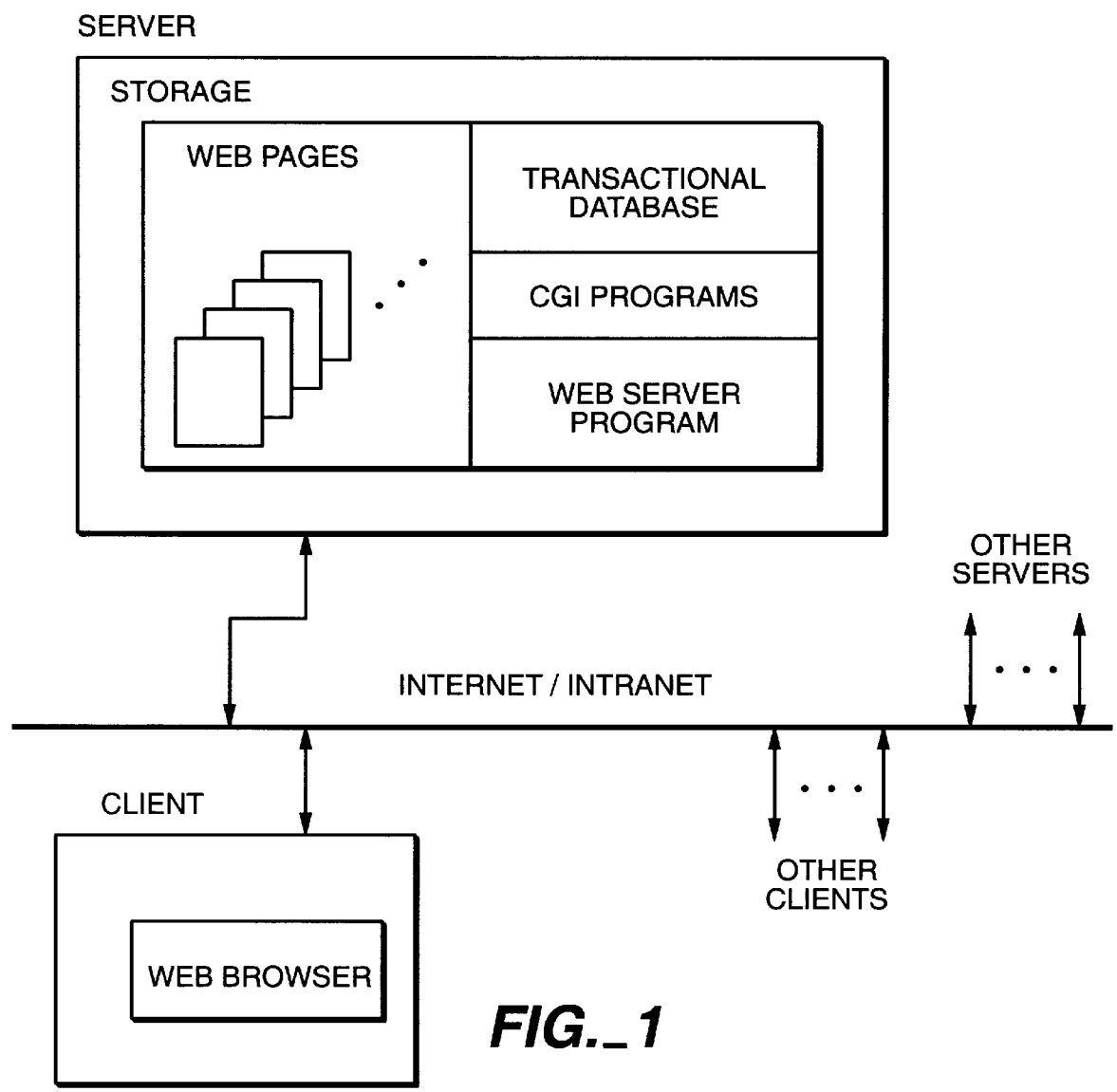
FIG._1

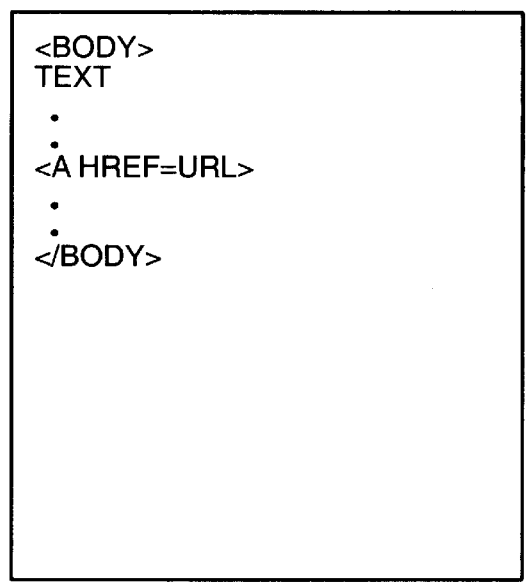
FIG._2
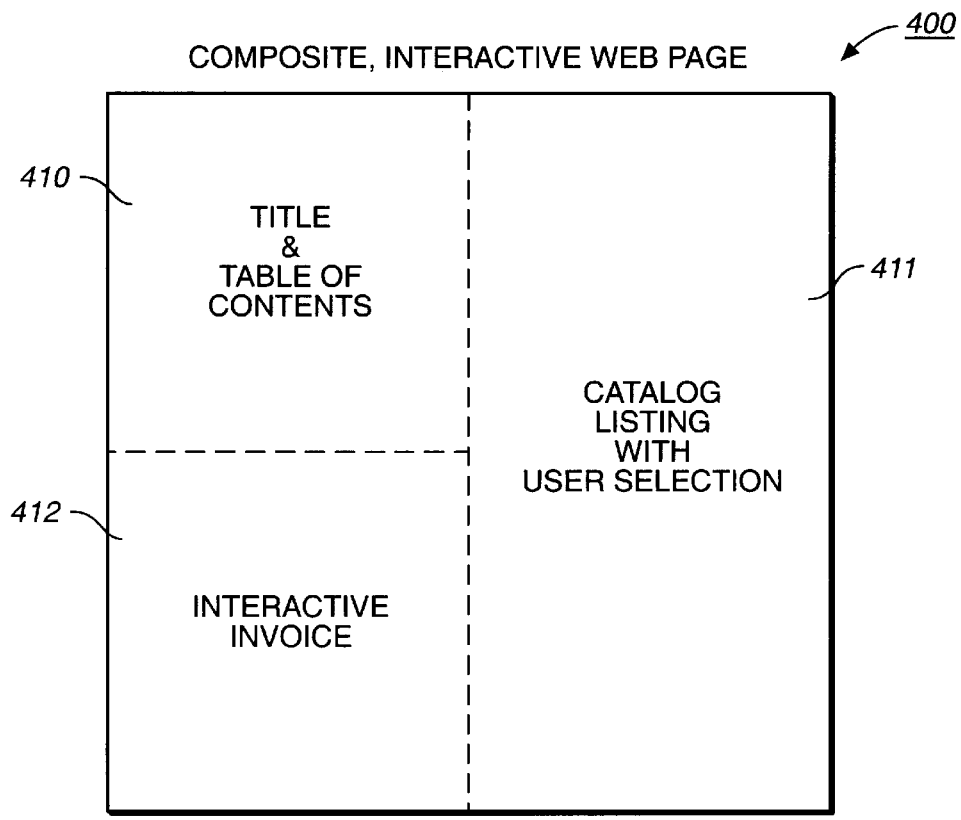
FIG._4

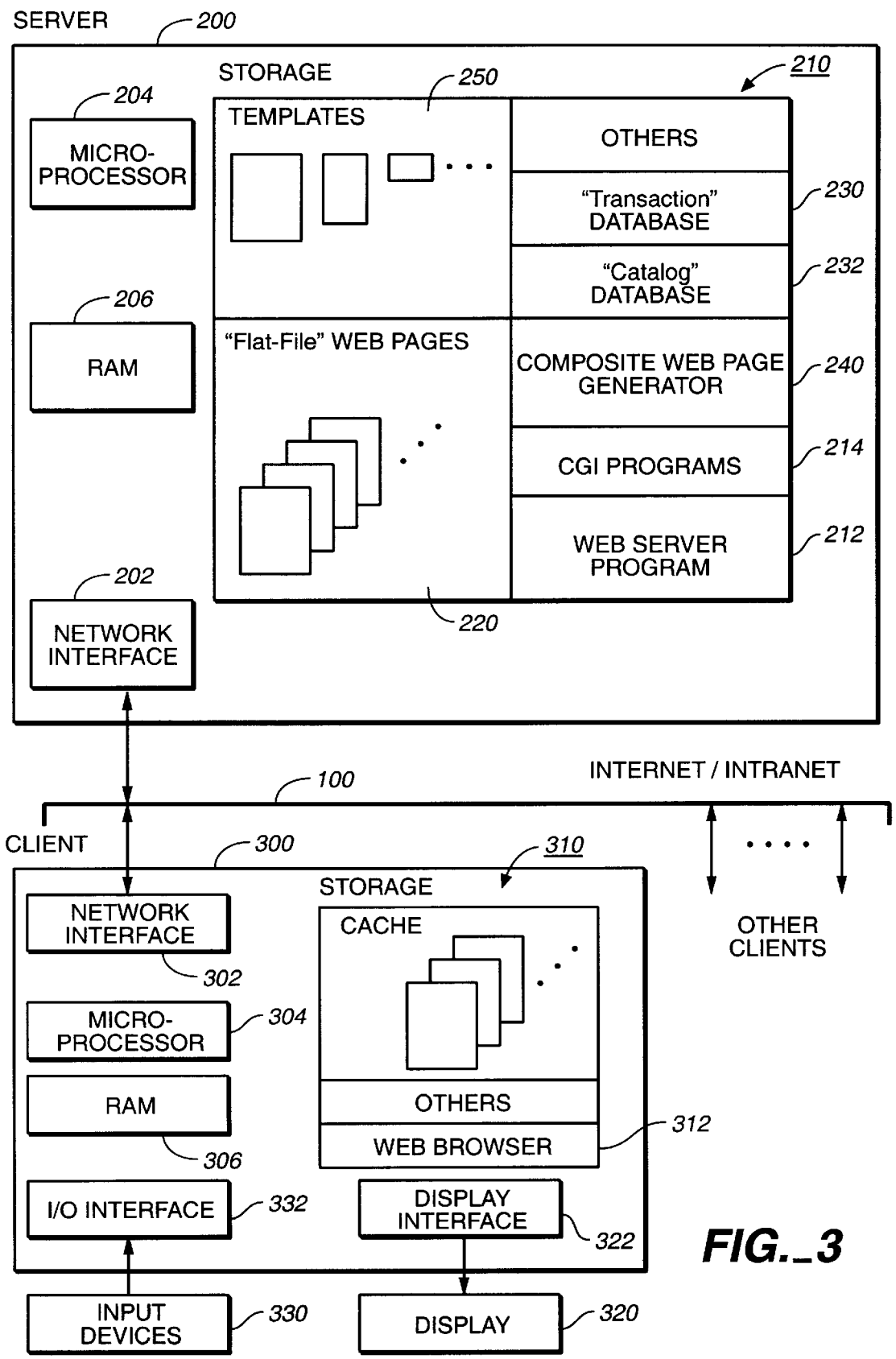
FIG._3

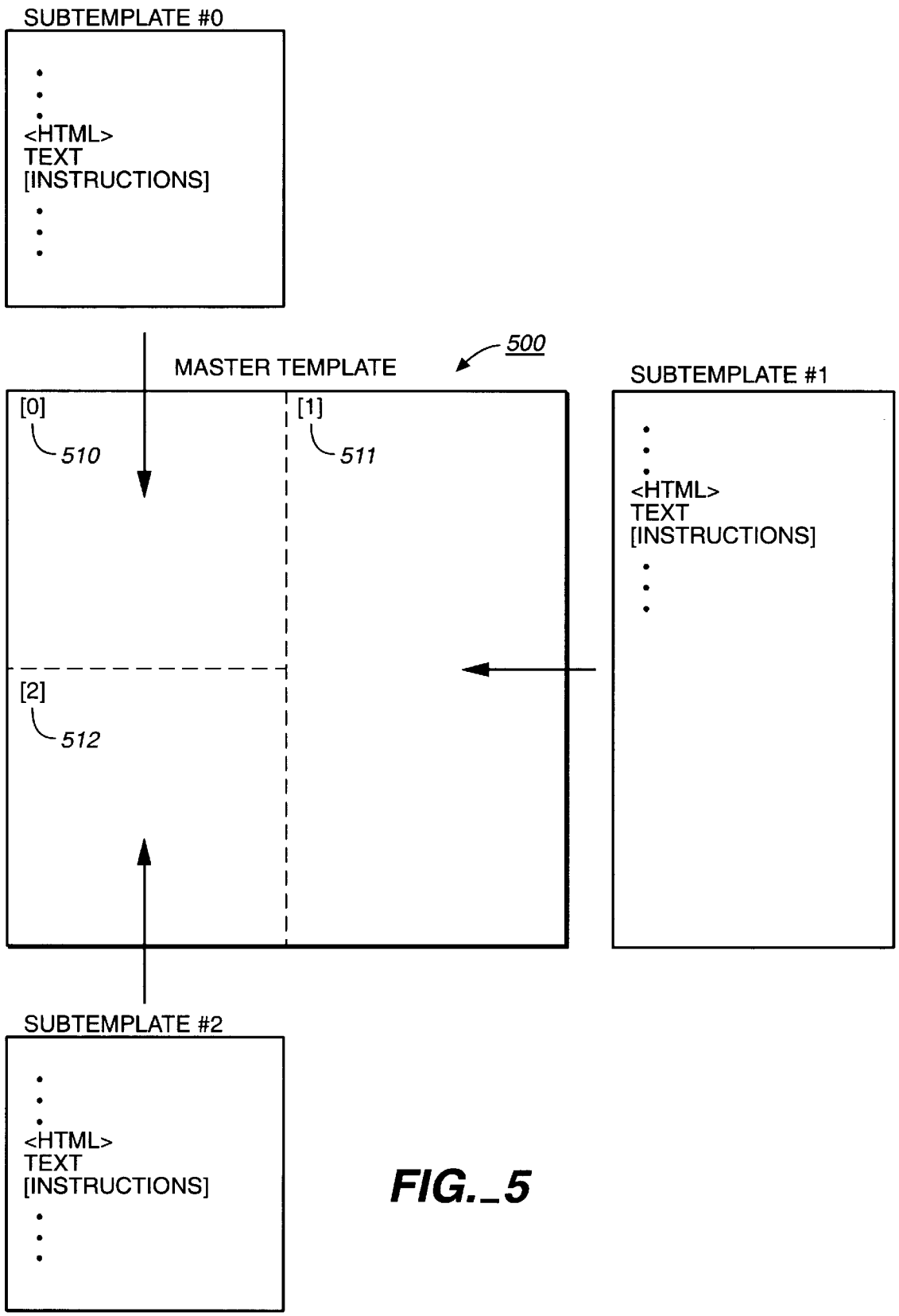
FIG._5

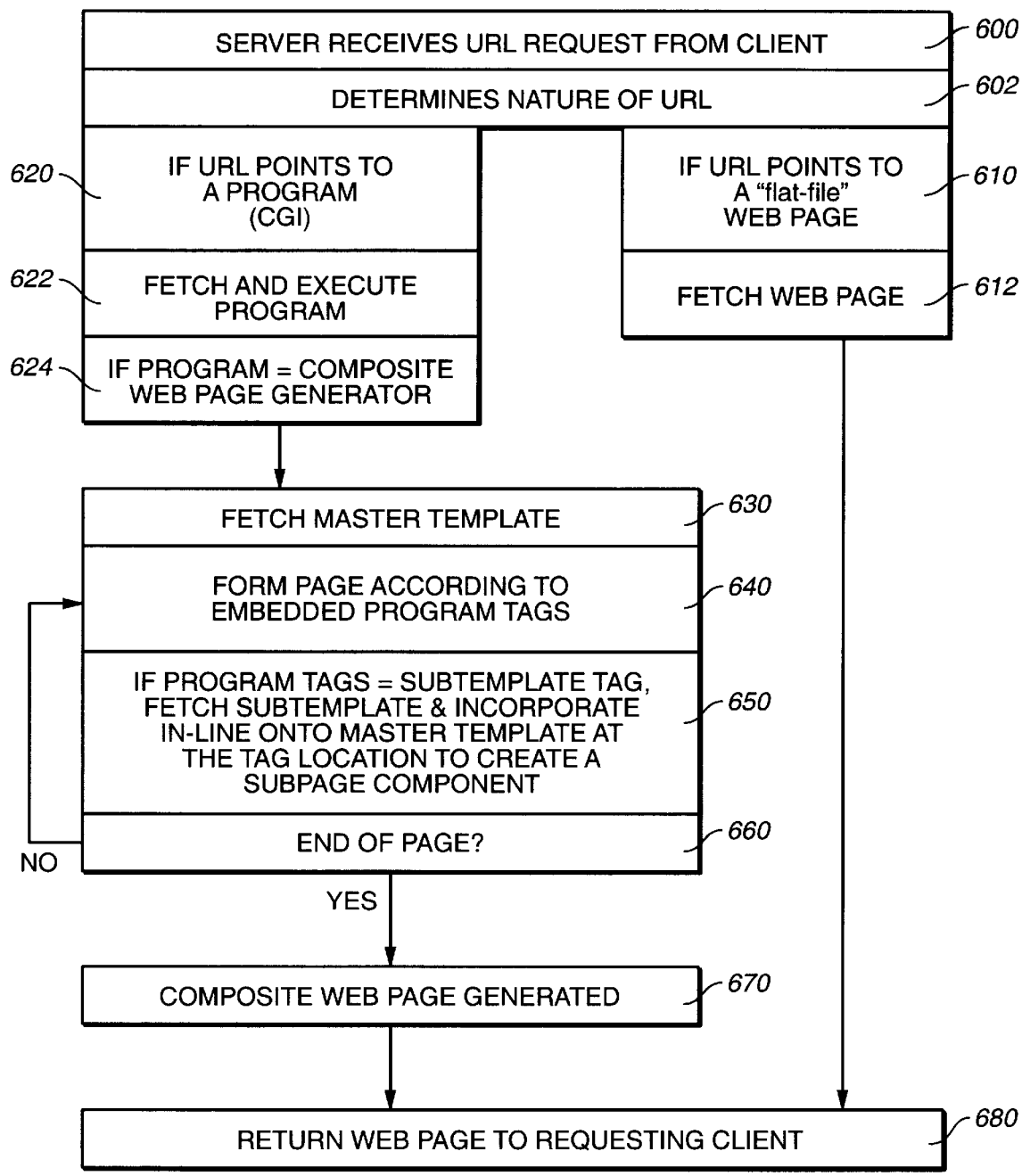
FIG._6

SYSTEM AND METHOD FOR DYNAMIC DATA INTERACTION IN A HYPERTEXT DATA PROCESSING SYSTEM

BACKGROUND OF THE INVENTION

The present invention generally relates to networked hypertext data processing systems and, more particularly, to managing interactive data in the World Wide Web.

Within a few years of being introduced on the. Internet, the World Wide Web (WWW) has quickly established itself as an important way to access information on the Internet. The World Wide Web is essentially a collection of hypertext documents or Web pages that exists across networks worldwide such as the Internet. The attraction of these Web pages is that they can carry multimedia information such as text, graphics, voice and video and that a Web page can contain links to call up other Web page anywhere on the network. The same structure can also be set up for a smaller domain such as an intranet defining one or more interlinked local area networks (LAN).

FIG. 1 is a schematic block diagram illustrating a typical operating environment of a hypertext data processing system. A collection of Web pages resides on a server computer which is connected to a network. A client computer on the network uses a Web browser program to request and view a Web page. A Web server program running on the server manages the Web pages and processes the client request to return the appropriate Web page to the client.

A well established set of protocol embodied in the form of Hypertext Transfer Protocol (HTTP) is used to define communication between server and client.

FIG. 2 shows schematically the basic elements on a Web page. A Web page is written in Hypertext Markup Language (HTML) with is essentially ASCII text consisting of pure text marked up by a set of HTML tags. By convention, ASCII strings enclosed in angular brackets are to be interpreted as HTML tags. HTML defines a collection of such tags which can be embedded in a Web page to give instruction to the browser as to how to handle and display the Web page. Examples of HTML tags schematically shown in FIG. 2 are tags such as <BODY>, </BODY> and <a HREF=URL>. Each Web page is uniquely identified by its Uniform Resource Locator (URL) which is like a document call number and is the address of the document on the network. The pair of <BODY>, </BODY> tags is used to delimit a body of text to let the browser identify what constitutes the body of the Web page. An embedded <a HREF=URL> tag is a hyperlink that allows a user to send a URL to the server to call up another Web page.

In a general sense the URL is a Web address that points to a unique location in a targeted server on the World Wide Web. In most applications, the address will lead to another Web page although it can also lead to initiate other actions by the server. For example, when an URL request is made, it is first routed to the targeted server. Then the server determines the nature of the URL which could be a request for another Web page, or a request for directory information on the server, or a request to execute a program on the server. Included in the HTTP protocol is a procedure called the Common Gateway Interface (CGI) for executing programs on a Web server (see FIG. 1).

While the World Wide Web was originally conceived to be mainly an application for clients to access information on the Internet, its wide acceptance and adoption has prompted further enhancements. With the advent of HTML version 2, input features have been added that allows a client to modify the fields of a database residing on a Web server. One application for this capability is a Web search engine which stores an index of Web pages on a database, such as the transactional database shown in FIG. 1. A client can input keywords or other search criteria to the server to run a CGI program. The program queries the database and returns a Web page listing the search results.

Another application of interest is on-line transactions such as an on-line retailing system on the World Wide Web. In such a system, a merchandise catalog for the variously items to be purchased may be listed on a number of Web pages ("catalog pages"). The user visits the catalog pages page-by-page and makes a purchase by activating a link (e.g. button) associated with the item to be purchased. This action transmits the user selection to the server to update a purchase ordering database. As more items are being selected, the purchase ordering database will similarly be modified. At anytime, the user can request to review a report of the current state of his or her purchase order. This is typically implemented by activating a linked button in the current Web page. Upon such a request, the server invokes a CGI program that queries the database and generates a report, such as a running invoice, and returns it as a newly created Web page ("invoice page") to the user's screen. This system inherits the basic operating mode of the HTML Web system, namely, the Web pages are browsed page-by-page. In an interactive applications, such as this one, the users has to alternate between the catalog pages and the invoice page to keep track of the current state of the purchase.

OBJECTS AND SUMMARY OF THE INVENTION

Accordingly, it is a general object of the present invention to provide a system and method for improved interactive transactions in a hypertext data processing system operating in a Web client-server network.

It is another object of the present invention to provide a system and method for improved implementation of a Web page in a hypertext data processing system operating in a Web client-server network.

It is another object of the present invention to provide a system and method for implementation of a composite Web page.

It is another object of the present invention to provide a system and method for implementation of a composite Web page that allows a user to send input in one component and interactively view a response from the server in another component of the composite Web page.

These and additional objects are accomplished by generating a composite interactive Web page that is partitioned into at least first and second subpages. A program is invoked to construct the composite Web page when the Web page is requested. A first subtemplate includes embedded instructions for a program to construct the first subpage so as to receive input intended for a database and to request the interactive Web page after an input is entered. A second subtemplate includes embedded instructions for the program to construct the second subpage to include a report of the database.

In one embodiment, the program is executed on the Web server.

In this way, a user on a client computer when visiting one or more Web pages can send input to modify a database in the server computer. An up-to-date report of the database is always displayed on the client computer's screen as one component of a composite Web page among a predefined set of such composite Web pages. In this way, the user is always presented with a current report of the result of the inputs made through a series of such composite Web pages.

In another embodiment, the program and the subtemplates are transferred to the client and the composite Web page is constructed by executing the program at the Web browser. A local copy of the database containing the user's transactions can be maintained at the client side. After the user has completed the transactions, the local copy of the database is transferred back to update that in the server.

According to another aspect of the invention, a template can contain partially filled text and HTML elements. It also contains embedded instructions for the program to construct the Web page. Some of the instructions may be in the form of subtemplate tags. The subtemplate tag instructs the program to insert a subtemplate at the tag location on the template. By the same scheme, a subtemplate can be inserted into another subtemplate.

Additional objects, features and advantages of the present invention will be understood from the following description of the preferred embodiments, which description should be taken in conjunction with the accompanying drawings.

BRIEF DESCRIPTION OF THE DRAWINGS

FIG. 1 is a schematic block diagram illustrating a typical operating environment of a hypertext data processing system;

FIG. 2 shows the basic elements on a Web page;

FIG. 3 is a schematic block diagram illustrating the hypertext data processing system, operating in a Web client-server network environment, according to a preferred embodiment of the present invention;

FIG. 4 shows the display of a specific composite, interactive Web page as an example illustrating the advantageous features of the present invention;

FIG. 5 is a schematic illustration of composing the example Web page of FIG. 4 by using a master template and subtemplates; and FIG. 6 is a flow diagram showing the operations in creating a composite Web page according to a preferred embodiment of the present invention.

DETAILED DESCRIPTION OF THE PREFERRED EMBODIMENTS

FIG. 3 is a schematic block diagram illustrating the hypertext data processing system, operating in a Web client-server network environment, according to a preferred embodiment of the present invention. A network 100 interconnects a server computer 200 and a client computer 300. The server 200 is coupled to the network 100 via a network interface 202. Similarly the client 300 is coupled to the network 100 via a network interface 302. The network 100 may be the Internet which is a vast global Web of interconnecting networks. It may also be an intranet which is operating in a domain of one or more interconnected Local Area Networks (LAN). In general, other servers and clients may also be connected to the network 100.

The server 200 is a computer that includes a microprocessor 204, a Random-Access Memory (RAM) 206, and storage 210. The storage 210 is typically a non-volatile mass storage such as magnetic disk drives. The storage 210 stores among others a number of Web-specific programs, such as a Web server program 212 and Common Gateway Interface (CGI) programs 214. When the server is operating as a Web server, the Web server program 212 is transferred to RAM 206 and is being executed from there by the microprocessor 204. The Web server program is generally compliant with standard HTML.

The storage 210 also stores a collection of Web pages 220, each addressable by its unique Uniform Resource Locator (URL). In the sense that each Web page in this stored collection is a fully formed page that is ready to be sent to a requesting client, these Web pages are also referred to as "Flat-file" Web pages.

The client 300 is another computer on the network that includes a microprocessor 304, a Random-Access Memory (RAM) 306, and storage 310. The storage 310 is typically a non-volatile mass storage such as magnetic disk drives. The storage 310 stores among others a Web browser program 312 that is generally compliant with standard HTML. A Web page is displayed by client 300 on a display 320 via a display interface 322. Input devices 330, such as a keyboard or a mouse are coupled to the client 300 via an I/O interface 332.

When the client is operating as a Web browser, the Web browser program 312 is transferred to RAM 306 and is being executed from there by the microprocessor 304. During operation, a Web page is on display and the user typically uses a mouse to click on an embedded link on the Web page to send an URL to the server 200. As described earlier, the server then determines the nature of the URL, which could be a request for another Web page, or a request to execute a CGI program on the server. If it is a request for a Web page from the collection of "Flat-File" Web pages 220, the addressed Web page is retrieved and returned to the client 300 where it is displayed in place of the last Web page. If it is a request to invoke a CGI program, the server 200 loads the CGI program addressed by the URL into RAM 206 and executes it. The CGI program typically results in an output which is written to a newly created Web page in HTML format. The newly formed Web page is then returned to the client 300 where it is displayed in place of the last Web page. In this way, the user can use a Web browser to request and view a sequence of Web pages whether the Web page is preformed as in a "Flat-file" Web page, or formed by the server upon request.

Since a Web page is capable of carrying multimedia information, a Web page often has a large file size relative to transmission rate between the server and the client. For example, one of the most common way for users to access the Internet is via a modem dial-up on a regular telephone line, which under ideal line condition amounts to 33 kilobits per second. A graphical object embedded on a Web page can easily be over 330 kilobytes, which at this bandwidth will take about 80 seconds to transmit at best. Thus, the practice is to avoid unnecessary transmissions from the server. One universal technique is to cache the transmitted pages in the client's local storage 310 so that the next time the same Web page is requested by its URL, the local copy from the cache is retrieved. For example, most browser has a back page and a forward page button that when activated essentially retrieves the locally cached Web pages sequentially page-by-page. While FIG. 3 illustrates the cache being located in mass storage 310, it is understood that portions or all of the cache may be located in RAM 306. The distribution being a consideration of tradeoffs between high speed of the RAM 306 and the large capacity and non-volatility of the mass storage 310.

The preferred embodiment is expediently described by reference to a specific example which is an improvement over the on-line retailing system described in an earlier section. As pointed out, one disadvantage of existing Web on-line retailing systems is that while a user asserts an action on one Web page he or she has to view the results in another Web page. In other words, the user cannot interactively be viewing input and output on one screen.

FIG. 4 shows the display of a specific composite, interactive Web page as an example illustrating the advantageous features of the present invention. The composite Web page 400 is constituted from a number of Web subpages, such as subpages 410, 411, 412. In the specific example, the composite Web page 400 represents one of many composite Web pages of the improved on-line retailing system. The subpage 410 displays the company name, logo and title, and a table of contents. Links are embedded in the table of contents for a user to navigate to various predefined Web pages. The subpage 411 displays a merchandise catalog listing such as that from a "Catalog" database 232 shown in FIG. 3. In one embodiment, associated with each listed item is an "add" button and a "subtract" button. When a user mouse clicks an item's "add" button, he or she is sending a buy order for the item to the server 200. The server updates a "transaction" database 230 (see FIG. 3) and generates a report in the form of an invoice that is displayed on the subpage 412. Similarly, if the item's "subtract" button is activated, a cancel order for a previously "bought" item is sent to the server 230. The "transaction" database 200 is appropriately updated and a report in the form of a revised invoice is displayed on the subpage 412. In another embodiment, each listed item on subpage 411 is hyperlinked to a detailed item Web page which is displayed in the subpage 411. The pair of "add" and "subtract" buttons is located on the detailed item Web page. In any case, the composite Web page 400 allows a user to "buy" or "cancel buy" items as the listing of items or the detailed item is browsed on subpage 411 while interactively viewing a running invoice on subpage 412.

Referring again to FIG. 3, the composite Web page shown in FIG. 4 is formed by a composite Web page generator 240 acting on one or more Web templates 250. The composite Web page generator 240 is stored in the server storage 210. When invoked by an appropriate URL, it is loaded into the server RAM 206 and executed. The Web templates 250 are also stored in the server storage 210.

FIG. 5 is a schematic illustration of composing the example Web page of FIG. 4 by using a master template and subtemplates. Each component of the composite Web page has a template associated with it. Where the template is associated with an entire Web page, it is referred to as a master template. Where the template is associated with a component of the composite Web page, it is referred to as a subtemplate. In either case, the template is a generalized Web page that may contain embedded program instructions in the form of program tags that can be interpreted by the composite Web page generator 240 (see FIG. 3). The program tags are shown as encased in square brackets in the templates shown in FIG. 5. They are custom tags which point to specific subprograms. In practice, a Web template usually assumes the form of a partially formed Web page, with the remaining unformed area being formed by the composite Web page generator 240 following subprogram instructions invoked by each embedded program tag.

In the present example by referring to FIGS. 4 and 5, subtemplate #0 is used to fill the subpage 410 with contents such as a title and a table-of-contents. In one embodiment, the subtemplate #0 is a "flat-file" Web page having static information. In another embodiment, the subtemplate #0 is a partially formed Web page, with additional program tags embedded in locations where dynamic program generation of contents is required. Similarly, subtemplate #1 is used to fill the subpage 411. The subtemplate #1 therefore has embedded program tags which invoke subprograms to fill the subpage 411 with contents such as catalog listing and user selection buttons. One subprogram pulls information from a "Catalog" database 250 (see FIG. 3) to form the catalog listing. Another subprogram embeds user selection buttons next to the items listed. Similarly, subtemplate #0 is used to fill the subpage 412. The subtemplate #0 therefore has embedded program tags which invoke subprograms to fill the subpage 412 with contents such as an interactive invoice. A subprogram pulls the latest report from the "Transaction" database 230 (see FIG. 3) to form the interactive invoice.

In one scheme, a master template corresponding to the entire Web page is used to define the layout boundary. Embedded on the master template are a number of specific program tags referred to as "template tags." The template tags 510, 511 and 512 respectively identifies subtemplate #0, subtemplate #1 and subtemplate #2 and marks the location on the master template 500 where each is to be inserted by the composite Web page generator 240. A hierarchical system of subtemplates can exist in which a subtemplate itself can have embedded template tags for inserting subtemplates.

In an equivalent scheme, the master template 500 may be considered to be partitioned into a plurality of subtemplates such as subtemplate #0, subtemplate #1 and subtemplate #3. In yet another equivalent scheme, the master template 500 itself can carry the contents of one of the subtemplates rather than purely being a layout board for subtemplates. For example, a master template can have the same contents built-in as that of subtemplate #0 in the same location, thereby using one less subtemplate.

FIG. 6 is a flow diagram showing the operations in creating a composite Web page according to a preferred embodiment of the present invention. In particular, description will be made to operations in creating the example Web page of FIGS. 4 by the composite Web page generator acting on the associated templates in FIG. 5. Referring first to FIG. 4, consider the situation when a user is viewing the composite Web page 400 and decides to buy a listed item shown in the Catalog subpage 411. He or she mouse-clicks an "add" button associated with the selected item. This activates a link and sends an URL to the server 200.

In Step 600, the server receives the URL from the client. In Step 602, the server determines the nature of the URL. In Step 610, if the URL points to a "flat-file" or preformed Web page, the server fetches the Web page in Step 612 and returns it to the requesting client in Step 680. In this particular example, the URL does not point to a "flat-file" Web page, so Steps 610, 612 and 680 are not executed. The URL points to a CGI program as in Step 620. Generally, the CGI program is fetched, loaded in RAM 206 and executed. In the present example, the URL actually points to a particular CGI program, namely the composite Web page generator, as in Step 624. Thus, in step 622 the composite Web page generator is fetched and is being executed in RAM 206. The following steps will then be under the control of the composite Web page generator.

In Step 630, a master template as specified by the URL is fetched from the storage 210.

In Step 640, the master template is scanned for embedded program tags. At each program tag, its associated subprogram is executed. A subprogram is typically written in one of the standard programming language such as C programming language, Visual Basic or JAVA scripts. The subprogram acts on other applications, such as a database on the server through the application's programming interface (API) or other standard data exchange techniques. Each subprogram typically generates an output that is written to the master template in HTML format to form the Web page.

In Step 650, if the program tag encountered turns out to be a subtemplate tag, as is the case in this example, the subtemplate identified by the subtemplate tag is fetched from the storage 210. Referring also to FIG. 5, in the present example, the subtemplate tags 510, 511 and 512 will be detected and the corresponding subtemplate #0, subtemplate #1 and subtemplate #2 will be fetched and incorporated in-line onto the master template 500 at locations identified by the template tags. In this way, the master template is composed of the three subtemplates. As each subtemplate is inserted in place, its contents in terms of text, HTML tags and program tags are transferred onto its own domain on the master template.

The master template is then scanned to act on the existing program tags as well as the ones transferred from the subtemplates. As the program tags embedded in the master template are being interpreted, appropriate actions taken and output therefrom is written to form the composite Web page in HTML format.

In Step 660, if the composite web page has been formed to the end of the page, proceed to Step 670, otherwise return to continue forming the composite Web using the master template as in Step 640.

In Step 670, the composite Web page has been completely formed.

In Step 680, the composite Web page is placed on the network 100 and routed back to the requesting client 300 (see FIG. 3).

In the preferred embodiment, in a multi-user environment, a session is created for each user where a user tag or identification is generated and is used to tag every Web page requested by the user. The user tag is incorporated as part of the URL when the Web page is formed. For this consideration, even if the Web page requested is a "flat-file" page, it is still generated by invoking the composite page generator acting on a given set of templates. In this way, the user tag can e written to the Web page as part of the composite page generation process.

As described in connection with FIG. 3 with the way the Web browser uses cache memory, when a previously requested Web page is called up again by its URL, a copy of it is retrieved from the local cache instead of from the server. In a dynamic information system such as the present example, this will pose issues of data synchronization between previous and current copies of data. Although a user has some control through the user interface of a typical Web browser to turn on or of f caching, the action applies to all Web pages.

In the preferred embodiment, use is made of a parameter in a URL header of each Web page that controls the aging or persistence of the Web page in the local cache memory. The URL header is system information packaged as part of the initial data stream returned by the Web server in fulfilling an URL request. By setting this parameter to zero, the Web page is effectively never cached. In this way, when the Web page is called up again, it is retrieved from the server. Thus, for those Web pages that are required to be retrieved from the server every time it is requested, they are generated by the composite Web page generator. They are generated using a template that includes an action to set the parameter in the URL for zero client-cache persistence.

In another embodiment, the composite Web page is constructed on the client computer under the control of the Web browser. A copy of the composite Web page generator and the required subtemplates need be transferred to the client computer before the composite Web page is constructed. In the case of the on-line retailing application, a local copy of the "transactional" or "invoice" database containing the user's transactions can be maintained at the client side. After the user has completed the purchasing, the transactional records from the local copy of the database is transferred back to update that in the server.

While the embodiments of the various aspects of the present invention that have been described are the preferred implementation, those skilled in the art will understand that variation thereof may also be possible. Therefore, the invention is entitled to protection within the full scope of the appended claims.

What is claimed is:

1. A method for providing an interactive Web page in a Web client-server network, comprising:
   partitioning said interactive Web page into at least first and second subpages by demarcating each subpage with a tag thereat;
   providing a database;
   providing a program for acting on said tag of each subpage along said interactive Web page;
   providing a first subtemplate that includes embedded instructions for said program to construct said first subpage to receive an input for said database, said program executing said embedded instructions of said first subtemplate when said tag of said first subpage is encountered;
   providing a second subtemplate that includes embedded instructions for said program to construct said second subpage to include a report of said database responsive to said input said program executing said embedded instructions of said second subtemplate when said tag of said second subpage is encountered; and
   generating said report and constructing said interactive Web page according to the instructions embedded on said first and second subtemplates.

2. A method for providing an interactive Web page in a Web client-server network as in claim 1, wherein at least one of said first and second subtemplates includes a partially formed Web page.

3. A method for providing an interactive Web page in a Web client-server network as in claim 1, wherein at least one of said first and second subtemplates includes an embedded instruction for said program to insert another subtemplate thereat.

4. A method for providing an interactive Web page in a Web client-server network as in claim 1, further comprising:
   providing a template that includes instructions for said program to form said interactive Web page, wherein said template including said tags associated with said at least first and second subpages.

5. A method for providing an interactive Web page in a Web client-server network as in claim 4, wherein said template includes a partially formed Web page with embedded instructions for fully forming said interactive Web page.

6. A method for providing an interactive Web page in a Web client-server network as in claim 1, wherein said first subtemplate includes a partially formed Web page with embedded instructions for fully forming said first Web subpage.

7. A method for providing an interactive Web page in a Web client-server network as in claim 4, wherein said second subtemplate includes a partially formed Web page with embedded instructions for fully forming said second Web subpage.

8. A method for providing an interactive Web page in a Web client-server network as in claim 4, further comprising:

providing a hierarchial structure of Web subpage templates that are nestable.

9. A hypertext data processing system for providing an interactive Web page in a Web client-server network, comprising:

a Web server;

a plurality of subtemplates stored on the server including first and second subtemplates;

a Web page template having a plurality of tags embedded therein each associated with one of said plurality of subtemplates;

a database responsive to input from said interactive Web page;

a program for acting on each said plurality of tags embedded in said Web page template to execute a subtemplate associated therewith;

said first subtemplate having embedded instructions for said program to construct a first subpage of said interactive Web page to receive input for said database and to request said interactive Web page after an input thereto; and said second subtemplate having embedded instructions for said program to construct a second subpage to include a report of said database thereon; and means for executing the embedded instructions in said first and second subtemplates to construct said interactive Web page.

10. A hypertext data processing system for providing an interactive Web page in a Web client-server network as in claim 9, wherein said means for executing the instructions includes a program executing on the server.

11. A hypertext data processing system for providing an interactive Web page in a Web client-server network as in claim 9, wherein said means for executing the instructions includes a program executing on the client.

* * * * *